US009118424B2

(12) United States Patent
Riggsby et al.

(10) Patent No.: US 9,118,424 B2
(45) Date of Patent: Aug. 25, 2015

(54) OPTICAL NETWORK UNIT (ONU) HAVING CONTROLLABLE OPTICAL OUTPUT AND METHOD OF CONTROLLING THE OPTICAL OUTPUT OF AN ONU

(75) Inventors: Robert R. Riggsby, Hickory, NC (US); Mark Vogel, Statesville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 713 days.

(21) Appl. No.: 13/081,352

(22) Filed: Apr. 6, 2011

(65) Prior Publication Data

US 2011/0255862 A1 Oct. 20, 2011

Related U.S. Application Data

(60) Provisional application No. 61/324,496, filed on Apr. 15, 2010.

(51) Int. Cl.
*H04B 17/00* (2006.01)
*H04B 10/564* (2013.01)
*H04W 88/08* (2009.01)
*H04B 10/2575* (2013.01)

(52) U.S. Cl.
CPC ........ *H04B 10/564* (2013.01); *H04B 10/25751* (2013.01); *H04W 88/08* (2013.01)

(58) Field of Classification Search
USPC ................................................. 398/115–117
See application file for complete search history.

(56) References Cited

U.S. PATENT DOCUMENTS

| 5,606,725 | A | * | 2/1997 | Hart | 725/131 |
|---|---|---|---|---|---|
| 6,226,114 | B1 | * | 5/2001 | Ashkeboussi et al. | 398/192 |
| 7,409,164 | B2 | * | 8/2008 | Seo | 398/162 |
| 7,457,378 | B1 | * | 11/2008 | Sher et al. | 375/345 |
| 7,965,939 | B2 | * | 6/2011 | Gadkari et al. | 398/67 |
| 8,107,819 | B2 | * | 1/2012 | Yang et al. | 398/98 |
| 8,396,369 | B1 | * | 3/2013 | Farmer et al. | 398/116 |
| 2002/0041728 | A1 | * | 4/2002 | Yamashita et al. | 385/24 |
| 2003/0002115 | A1 | * | 1/2003 | Schemmann et al. | 359/173 |
| 2005/0250541 | A1 | * | 11/2005 | Bird et al. | 455/561 |
| 2007/0147388 | A1 | * | 6/2007 | Kim et al. | 370/395.21 |
| 2008/0310842 | A1 | * | 12/2008 | Skrobko | 398/72 |
| 2008/0310846 | A1 | | 12/2008 | West, Jr. | |
| 2009/0123149 | A1 | * | 5/2009 | Asghari et al. | 398/25 |
| 2009/0133084 | A1 | * | 5/2009 | Ramsdell et al. | 725/114 |
| 2009/0203348 | A1 | * | 8/2009 | Nishimura et al. | 455/341 |
| 2009/0208211 | A1 | * | 8/2009 | Tamai | 398/67 |
| 2011/0058810 | A1 | * | 3/2011 | Lee et al. | 398/45 |

* cited by examiner

*Primary Examiner* — David Payne
*Assistant Examiner* — Tanya Motsinger
(74) *Attorney, Agent, or Firm* — Muncy, Geissler, Olds & Lowe, P.C.

(57) ABSTRACT

An optical network unit (ONU) includes an optical interface, a detector producing an output signal based on a characteristic of an optical input received via the optical interface, a radio-frequency (RF) interface, an opto-electrical (O/E) converter in a first path from the optical interface to the RF interface, an electro-optical (E/O) converter in a second path from RF interface to the optical interface and a controller operatively connected to the detector, the controller being configured to adjust an optical output of the ONU based on the characteristic, where the characteristic may be a level of the received signal. Also a method of adjusting an optical output of an ONU based on a characteristic of a received signal.

10 Claims, 4 Drawing Sheets

OPTICAL NETWORK UNIT (ONU) HAVING CONTROLLABLE OPTICAL OUTPUT AND METHOD OF CONTROLLING THE OPTICAL OUTPUT OF AN ONU

CROSS-REFERENCE TO RELATED APPLICATIONS

The present application claims the benefit of U.S. Provisional Patent Application No. 61/324,496, filed Apr. 15, 2010, the entire contents of which are hereby incorporated by reference.

FIELD OF THE INVENTION

The present invention is directed toward an optical network unit (ONU) having an adjustable optical output and toward a method of adjusting the optical output of an ONU, and, more specifically, toward an ONU having an optical output controlled by a characteristic of an optical signal received at the ONU and toward a method of adjusting the optical output of an ONU based on a characteristic of an optical signal received at the ONU.

BACKGROUND OF THE INVENTION

Known fiber-to-the-home (FTTH) systems send and receive bidirectional optical signals over a single fiber. Signals from a headend, generally at a wavelength of 1550 nm, are sent downstream to an ONU (which may comprises an RF over glass ONU or RONU) at a customer location, and signals from the ONU are sent upstream, generally at either 1310 nm or 1610 nm, back to the headend. Wavelength division multiplexing (WDM) methods allow these signals to travel over a single fiber at the same time. The ONU is connected to a customer premises device, such as a cable modem, a media terminal adapter or a set top box, using coaxial cable or another medium for carrying electrical radio frequency (RF) signals. The ONU converts optical signals arriving at the ONU from the headend into RF signals usable by the customer premises device using an opto-electrical (O/E) converter and converts RF signals arriving at the ONU from the customer premises device into optical signals for transport over the optical fiber using an electro-optical (E/O) converter. In this manner, the capacity of optical fibers can be enjoyed for most of the distance from the headend to the customer premises device while still using a conventional customer premises device that sends and receives RF signals.

Such networks may include optical splitters for selectively removing signals from an optical fiber and carrying them to an ONU. In a centralized system, as illustrated in FIG. 4, a main fiber 200 arrives at a splitter 202, and the signal from the main fiber 200 is split into a desired number of additional signals for transmission over additional fibers, such as fiber 204, that connects to an ONU, such as ONU 206, connected to a customer premises device, such as customer premises device 208. In a fully distributed system, illustrated in FIG. 5, the splitters may be referred to as "taps" 210 and each may, for example, split one or more signals from a main fiber 212 at a number of different locations for transport over an additional fiber, such as fiber 214, to an ONU such as ONU 216 and from there to a customer premises device such as customer premises device 218. As will be appreciated, in such systems, the distance from the headend to each customer premises device will vary. Because of the differing fiber lengths, the port-to-port variation of given optical splitter components and the cascading of this variance when a split is not centralized, the optical received power at each ONU will vary over some design range.

In a process known as RF long loop automatic gain control (AGO), a controller at the headend sends a signal to a customer premises device to set the RF output level of the customer premises device. The controller at the headend adjusts the RF output level in an effort to keep the strength of optical signals received from each ONU at the headend in the system at a given level. Thus, for example, if the strength of an optical signal received at the headend from a given ONU is too high, the headend may instruct the customer premises device connected to that ONU to transmit RF signals at a lower power. This in turn will cause the ONU to transmit optical signals having a lower power.

The headend will receive optical signals from a first ONU at a first level and signals from the a second ONU at a second level less than the first level. The difference in RF signal levels that produce these optical signals will be twice the difference in optical signal strength. This is due to the optical-to-electrical conversion properties of the optical receiver used in a network to terminate the optical signal from the FTTH premise equipment. For example, assume that the highest loss optical link in a splitter group has a loss—that is 6 dB greater than the lowest loss link in that same splitter group, and that the customer premises devices are configured to operate at an RF output of 50 dBmV. With this network configuration, the customer premises device on the shortest optical link, when operating at 50 dBmV, will produce an RF signal at the input to the ONU that will be higher by two times the optical delta between the links. This is because when photons are converted to current in the optical detector, a 1 dB increase in optical power produces a 2 dB increase in signal current. Thus a 50 dBmV input signal to the ONU on the lowest loss optical link will cause the ONU to send an optical signal to the headend that will be 6 dB too high. As a result the headend will instruct the customer premises device to reduce its RF output level by 2*6 or 12 dB, lowering the RF output level of the ONU to 50-12, or 38 dBmV.

A problem with addressing the foregoing problem by changing the RF output level of a customer premises device is that the RF input operating range of the ONU is limited by the maximum/minimum operating range of the customer premises device. The RF variance reduces that operating range by the amount of the RF variance. For example, a DOCSIS 3.0 cable modem may have a maximum RF output of 51 dBmV when operating in a 4 bonded channel mode. It may also have a minimum RF output of 23 dBmV when operating at the highest symbol rate. This makes the operating range 28 dB. If the optical variance is 6 dB, then there is 12 dB of RF variance. This reduces the RF operating range to 28-12, or 16 dB. This means that the amount of inside wire loss and system margin for the system is reduced from 28 to 16 dB.

One method to address this issue is to utilize an FM system as discussed in U.S. patent application No. 2008/0310842 to Skrobko and U.S. patent application No. 2008/0310846 to Ibelings. Such systems may allow for a single RF input level at the FTTH premise equipment because the link gain is constant and independent of the optical link loss. However, an FM system is limited because it cannot support the activation of more than one FTTH premise equipment at any given time. If that occurs, two FM signals are sent that cannot be resolved at the receiver, and both data transmissions are lost. This forces an operator to implement a single upstream system protocol, such as DOCSIS, which generally means a customer premises device upgrade/change at the customer location. This is also an issue for users who want to implement multiple services on different equipment in the serving office, but who do not want to have to synchronize the timing of those systems.

It would therefore be desirable to provide a method and device for obtaining a desired optical signal level input level at a network headend without adversely affecting the RF input range of ONU's in the system.

SUMMARY OF THE INVENTION

These problems and others are addressed by embodiments of the present invention, a first aspect of which comprises a method that involves providing an optical network unit (ONU) having an optical interface, a radio-frequency (RF) interface, an opto-electrical (O/E) converter in a first path from the optical interface to the RF interface, and an electro-optical (E/O) converter in a second path from the optical interface to the RF interface. The method includes receiving an optical signal at the ONU optical interface and passing the received signal to the O/E converter, receiving an RF signal at the ONU RF interface from a customer premises device, analyzing the received optical signal, and adjusting a level of an optical output of the ONU based on the analyzing.

Another aspect of the invention comprises an optical network unit (ONU) having an optical interface, a detector producing an output signal based on a characteristic of an optical input received via the optical interface, and a radio-frequency (RF) interface. An opto-electrical (O/E) converter is located in a first path from the optical interface to the RF interface, an electro-optical (E/O) converter is located in a second path from RF interface to the optical interface, and a controller is operatively connected to the detector. The controller is configured to adjust an optical output of the ONU based on the characteristic.

A further aspect of the invention comprises a system that includes a headend for transmitting optical data signals and control signals and an optical network unit (ONU) having an optical interface connected to the headend. The optical interface is configured to receive a downstream optical signal from the headend and to send an upstream optical signal to the headend. The ONU also includes a radio frequency (RF) interface, an opto-electrical (O/E) converter in a first path from the optical interface to the RF interface, a detector in the first path for producing an output based on a characteristic of the downstream optical signal, an electro-optical (E/O) converter in a second path from the RF interface to the optical interface, and a controller operatively connected to the detector. The system also includes a customer premises device connected to the ONU RF interface, and the headend is configured to send a control signal to the customer premises device via the ONU to control an RF output level of the customer premises device based on a level of the upstream optical signal sent from the ONU to the headend. The controller is configured to control a level of the upstream optical signal based on the detector output.

BRIEF DESCRIPTION OF THE DRAWINGS

These and other aspects of the present invention will be better understood after a reading of the following detailed description together with the attached drawings, wherein.

DETAILED DESCRIPTION

Figure 1:
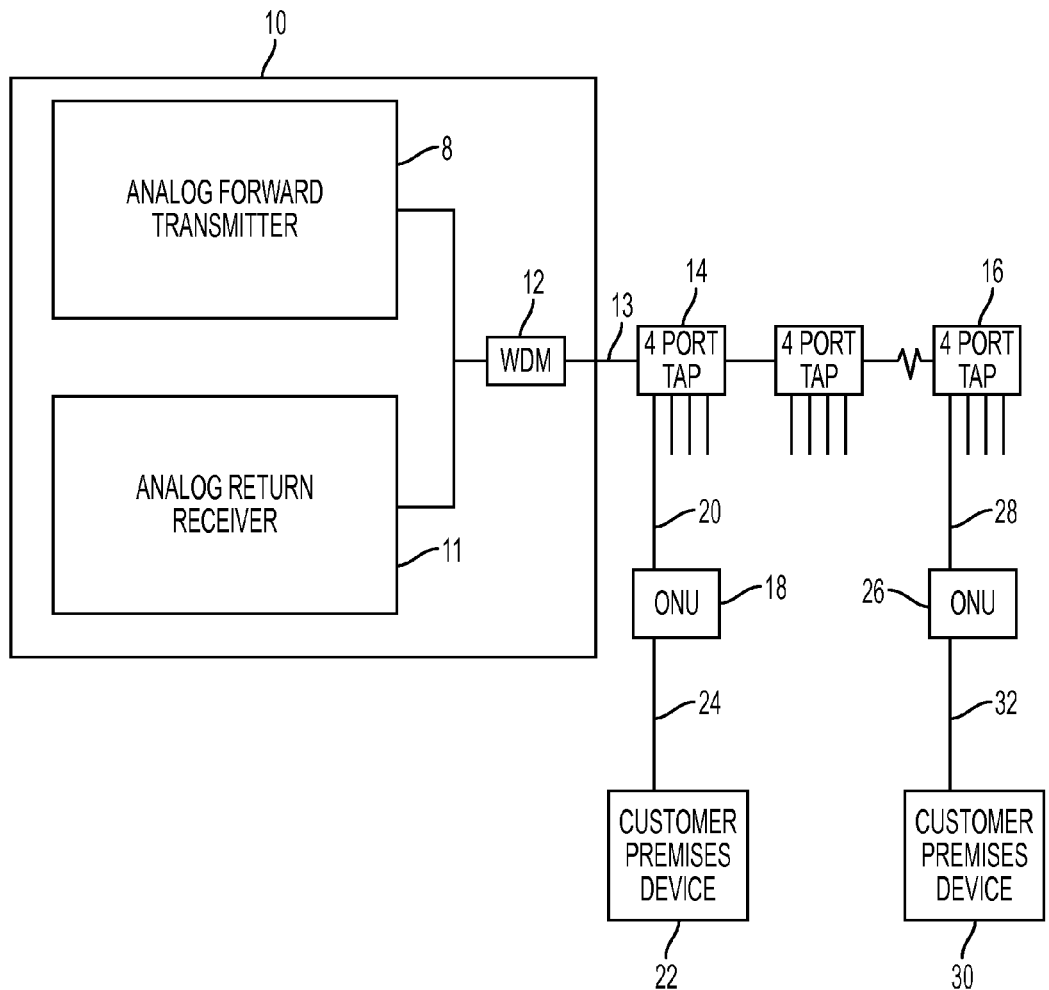
FIG. 1 is a schematic illustration of a network including first and second ONU's according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a network having a headend 10 comprising an analog forward transmitter 8, an analog return receiver 11, a wavelength division multiplexing device 12 and a plurality of taps along an optical fiber 13 including a first tap 14 and a second tap 16 which taps comprise, in the present embodiment, four-port taps. First tap 14 is connected to a first ONU 18 by a first optical fiber 20, and first ONU 18 is connected to a first customer premises device 22 by a first coaxial cable 24. Second tap 16 is connected to a second ONU 26 by a second optical fiber 28, and second ONU 26 is connected to a second customer premises device 30 by a second coaxial cable 32 and has a higher optical link loss than ONU 18. Headend 10, the first and second ONU's 18, 26, and the first and second customer premises devices 22, 30, are bidirectional devices. Headend 10 sends optical signals to and receives optical signals from the first and second ONU's 18, 26, and first and second customer premises devices 22, 30, send RF signals to and receive RF signals from the first and second ONU's 18, 26. The first and second ONU's 18, 26, send optical signals to and receive optical signals from the headend 10 and send RF signals to and receive RF signals from the first and second customer premises devices 22, 30, converting RF signals to optical signals and optical signals to RF as described hereinafter. As used herein, "RF signals" is intended to describe non-optical radio frequency signals, for example, of a type typically transmitted over a coaxial cable or other electrical conductor. Signals transmitted over optical fiber are referred to herein as "optical" signals, regardless of whether they encode radio frequency information. Thus, for example, in the case where ONU's comprise radio-frequency-over-glass ONU's (RONU's), the portion of the signal arriving at the RONU over the optical fiber will be referred to as the "optical" signal while the electrical portion of the signal leaving the RONU on a coaxial or similar conductor will be referred to as the "RF" signal.

Figure 2:
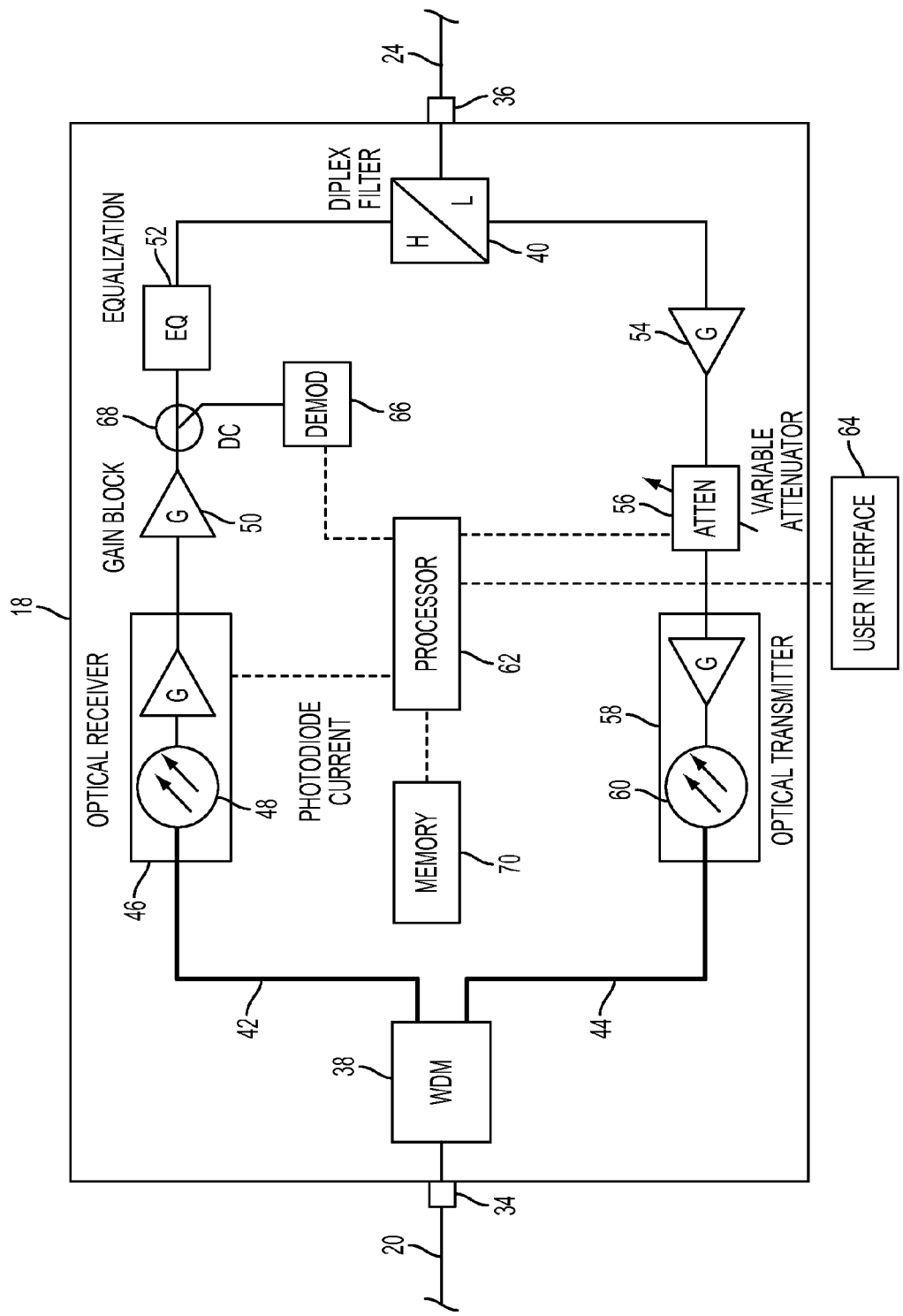
FIG. 2 is schematic diagram of one of the ONU's of FIG. 1.

First ONU 18 is illustrated in FIG. 2; second ONU 26 is substantially identical thereto and will not be described separately. First ONU 18 includes an optical interface 34 connected to first optical fiber 20 through which optical signals enter and leave the first ONU 18 and an RF interface 36 connected to first coaxial cable 24 through which RF signals enter and leave the first ONU 18. A wavelength division multiplexer 38 is connected to optical interface 34, and a diplex filter 40 is connected to RF interface 36. A first signal path 42 and a second signal path 44 extend between the wavelength division multiplexer 38 and the diplex filter 40, with the first signal path 42 generally carrying signals downstream from the headend 10 to the first customer premises device 22 and the second signal path generally carrying upstream signals from the first customer premises device 22 to the headend 10. The transmission of bidirectional signals over a single carrier, optical or RF, at different wavelengths or frequencies, for example, is well-known and will not be described further.

First signal path 42 includes a opto-electrical (O/E) converter 46 having a photodiode 48, a gain block 50 and an equalizer 52, in that order, in a direction from the wavelength division multiplexer 38 to the diplex filter 40, and second signal path 44 includes a gain stage 54, a variable attenuator 56 and an electro-optical (E/O) converter 58 including a photodiode 60, in that order, from the diplex filter 40 to the wavelength division multiplexer 38. A controller, such as a processor 62, is connected to the O/E converter 46, to the variable attenuator 56 and to a user interface 64, and a demodulator 66 is connected between processor 62 and a point 68 downstream of gain block 50 in first path 42. Processor 62 is also connected to a memory 70 in which a reference value may be stored, and, as discussed hereinafter, the processor 62 controls the variable attenuator 56 based on this reference value and on information received from the O/E converter 46.

When first ONU 18 is connected to a headend 10 that performs long loop automatic gain control, headend 10 may adjust the output of first customer premises device 22 when the level of the optical signal received from first ONU 18 at headend 10 is too high. In order to avoid the disadvantages caused by lowering the output RF level of the first customer premises device 22, the present inventors have determined that the output of the first ONU 18 can instead be controlled. This is done by comparing the input optical signal level (determined by measuring the current through photodiode 48, for example) to a reference level stored in memory 70 and adjusting variable attenuator 56 in a manner that reduces the level of the signal provided to E/O converter 58 and thus the level of the optical signal output from optical interface 34 and received at headend 10. For example, if the equipment in headend 10 is set to operate with an RF input at 0 dBmV, the signals from the highest loss optical links in the network, sent from second ONU 26 at 50 dBmV, for example, would be expected to arrive at the headend 10 at a level of 0 dBmV. Signals arriving from lower loss link ONU's, such as first ONU 18, for example, will experience lower levels of loss and will arrive at headend 10 at a level of more than 0 dBmV. This, in turn may cause the headend 10 to reduce the output power of first customer premises device 22 so that signals arriving at headend 10 from first ONU 18 will also arrive at a level of 0 dBmV.

Optical signals travel both upstream and downstream in the network of FIG. 1, and therefore knowledge of a received optical signal strength can be used to calculate a reference value for use by the other ONU's including first ONU 18. Thus, if measurements of the received optical signal strengths at first ONU 18 and second ONU 22 indicate that the received signal strength at first ONU 18 is 6 dB higher than the received signal at second ONU 22, the strength of the optical signal output from first ONU 18 will be 6 dB too high when received at the headend and must be reduced by 6 dB. This is done in order to prevent headend 10 from making adjustments to the RF signal output level of first customer premises device 22. Processor 62 thus controls variable attenuator 56 to attenuate the signal provided to E/O converter 58 by 12 dB, thereby reducing the level of the optical signal output from optical interface 34 by 6 dB and producing an optical signal at headend 10 with a level of 0 dBmV without changing the RF output levels of first customer premises device 22.

To enable the greatest flexibility, it may also be useful to set the reference level stored in memory 70 at the first ONU 18 using dip switches (not illustrated) or local user interface 64, or remotely through network communication to the ONU. This may be done, for example, by demodulating control signals in first signal path 42 using demodulator 66 and providing those control signals to processor 62 to cause processor 62 to store a new reference value in memory 70. This allows the continued use of an ONU even as optical input levels change, the result, for example, of reducing the number of channels carried in the downstream direction or a change from analog to digital channels. For example, assume that an existing ONU is set to a reference receive level of −6 dBmV, and that the system downstream channel loading has been modified such that the minimum receive level of an ONU is now −10 dBm. With the user interface 64, a technician could simply adjust the reference level to correlate to a −10 dBm input, and the first ONU 18 would now use −10 dBm as its reference level. Alternatively, a technician in a remote location such as a headend 10 could initiate a change via network management software, which would send a message to the first ONU 18 which would be demodulated by demodulator 66 and provided to processor 62 to cause processor 62 to store a new reference value in memory 70.

Figure 3:
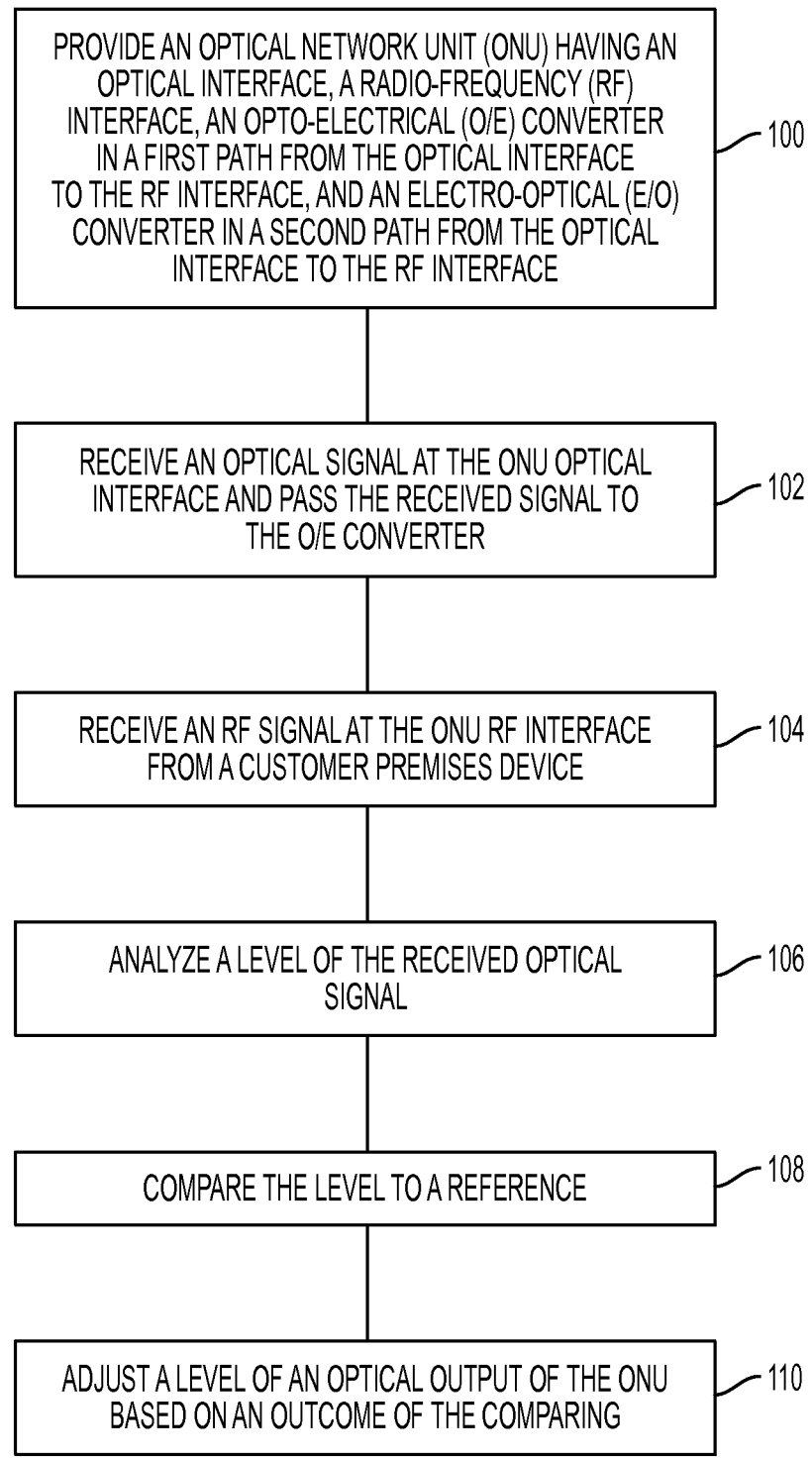
FIG. 3 is a flow chart illustrating a method according to an embodiment of the present invention.
Figure 4:
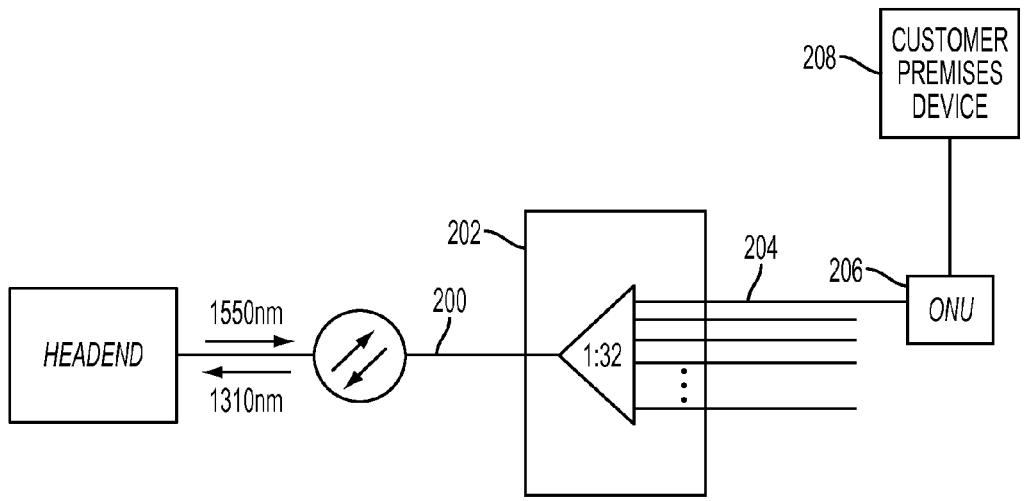
FIG. 4 is a schematic illustration of a conventional network with a centralized optical splitter.
Figure 5:
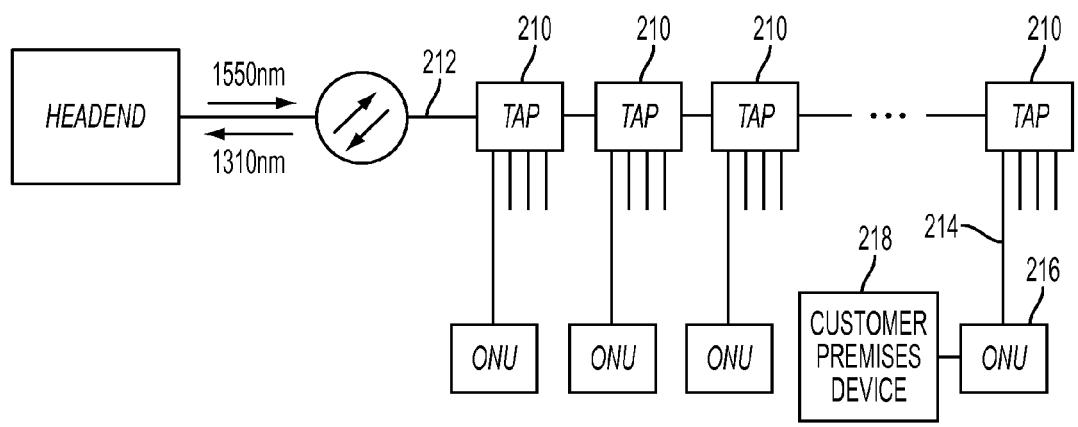
FIG. 5 is a schematic illustration of a conventional network using distributed taps for splitting optical signals from a fiber.

A method according to an embodiment of the present invention is illustrated in FIG. 3 and includes a step 100 of providing an optical network unit (ONU) having an optical interface, a radio-frequency (RF) interface, an opto-electrical (O/E) converter in a first path from the optical interface to the RF interface, and an electro-optical (E/O) converter in a second path from the optical interface to the RF interface. The method also includes a step 102 of receiving an optical signal at the ONU optical interface and passing the received signal to the O/E converter, a step 104 of receiving an RF signal at the ONU RF interface from a customer premises device, a step 106 of analyzing a level of the received optical signal, a step 108 of comparing the level to a reference, and a step 110 of adjusting a level of an optical output of the ONU based on an outcome of the comparing.

The present invention has been described herein in terms of a presently preferred embodiment. Modifications and additions to this embodiment will become apparent to those of ordinary skill in the relevant arts upon a reading of the foregoing disclosure. It is intended that all such modifications and additional comprise a part of the present invention to the extent they fall within the scope of the several claims appended hereto.

We claim:

1. A method comprising:
  providing an optical network unit (ONU) having an optical interface, a radio-frequency (RF) interface, an opto-electrical (O/E) converter in a first path from the optical interface to the RF interface, and an electro-optical (E/O) converter in a second path from the RF interface to the optical interface;
  receiving from a head end a downstream optical signal at the ONU optical interface and passing the received downstream signal to the O/E converter;
  receiving an RF signal at the ONU RF interface from a customer premises device RF transmitter;
  detecting a level of the downstream optical signal received at the ONU;
  comparing the detected level of the received downstream optical signal to a reference value;
  amplifying the received RF signal to generate a corresponding amplified RF signal;
  attenuating the amplified RF signal, based on a result of the comparing, to generate a corresponding attenuated amplified RF signal;
  applying the attenuated amplified RF signal to the E/O converter in the second path to generate a corresponding upstream optical signal, and transmitting the upstream optical signal from the optical interface to the headend;
  receiving the upstream optical signal at the headend;
  performing a long loop automatic gain control comprising detecting, at the headend, a level of the received upstream optical signal and,
  if the detected level exceeds a given level, the headend sending a control signal to adjust the customer premises RF transmitter output level; and
  setting the reference at a reference value wherein the attenuating based on the comparing generates the upstream optical signal at a level that prevents the detected level at the headend from exceeding the given level, to prevent the headend, in performing the long loop gain control, from sending the control signal to adjust the customer premises RF transmitter output level.

2. The method of claim 1 including providing a processor in the ONU, providing a memory operatively connected to the processor, storing the reference in the memory, and providing a user interface operatively connected to the processor and, wherein setting the reference at the reference value includes receiving a user command from the user interface and changing the reference based on the received user command.

3. The method of claim 1 wherein detecting a level of the received downstream optical signal comprises measuring a photodiode current in the O/E converter.

4. The method of claim 1 wherein attenuating the received RF signal comprises attenuating the received RF signal by about twice a difference between the level of the received optical signal and the reference.

5. The method of claim 1, wherein the headend sending the control signal to adjust the customer premises RF transmitter comprises the headend sending the control signal within the downlink optical signal to the ONU, and the ONU sending the received control signal to the customer premises RF transmitter.

6. The method of claim 1, wherein setting the reference comprises
  the headend sending a reference setting control signal to the ONU within the downlink optical signal;
  the ONU demodulating the received reference setting control signal; and
  the ONU setting the reference value based on the demodulated control signal.

7. A system comprising:
  a headend configured for transmitting a downstream optical signal;
  an optical network unit (ONU) having an optical interface connected to the headend, the optical interface configured to receive the downstream optical signal from the headend and to send an upstream optical signal to the headend, a radio frequency (RF) interface, a first path from the optical interface to RF interface, and a second path from the RF interface to the optical interface,
  wherein the first path comprises an opto-electrical (O/E) converter having an optical input coupled to the optical interface and an electrical output coupled to the RF interface, wherein the O/E converter includes a photodetector that produces a detector output signal based on a characteristic of the downstream optical signal received at the optical interface,
  wherein the second path comprises an RF amplifier having an input configured to receive an RF signal from the RF interface, and an output for outputting an amplified RF signal, a variable RF attenuator having an input configured to receive the amplified RF signal, a control input for receiving an attenuation control signal, and an output for outputting an attenuated amplified RF signal at a level based on the attenuation control signal, an electro-optical (E/O) converter having an electrical input coupled to the output of the variable attenuator and having an optical output coupled to the optical interface, and wherein the ONU further comprises a controller operatively connected to the photodetector to receive the detector output signal and to the variable RF attenuator; and a customer premises device having an RF transmitter connected to the ONU RF interface for providing the RF signal to the ONU RF interface, wherein, the headend is further configured to perform a long loop gain control by detecting a level of the upstream optical signal received at the headend from the ONU and, if the detected level exceeds a given level, to send a control signal to the customer RF transmitter of the premises device via the ONU to control an RF output level of the RF transmitter, wherein the controller of the ONU is configured to control a level of the upstream optical signal based on the detector output by generating the attenuation control signal to adjust the variable RF attenuator based on a comparing of the detector output signal to a reference, and wherein the reference is at a reference value wherein the comparing causes the attenuating control signal to adjust the variable RF attenuator to output the attenuated amplified RF signal at a level at which the upstream optical signal received at the headend does not exceed the given level, to prevent the headend, in performing the long loop gain control, from sending the control signal to adjust the customer premises RF transmitter.

8. The system of claim 7, wherein the ONU further includes a demodulator connected between the first path and the controller for demodulating control signals from the headend in the downstream optical signal and providing the control signals to the controller.

9. The system of claim 8, wherein the headend is configured to include a reference setting control signal in the downstream optical signal, wherein the demodulator is configured to demodulate the reference setting control signal in the downstream optical signal and to provide the demodulated reference setting control signal to the controller, wherein the controller is configured to set the reference to a reference value in accordance with the provided demodulated reference setting control signal.

10. A method comprising:

receiving at an optical network unit (ONU) an optical downstream signal from a head end;

receiving at the ONU an RF signal from a customer premises device RF transmitter;

amplifying at the ONU the received RF signal to generate a corresponding amplified RF signal;

attenuating at the ONU the amplified RF signal to generate a corresponding attenuated amplified RF signal;

converting at the ONU the attenuated amplified RF signal to a corresponding upstream optical signal;

transmitting the upstream optical signal from the ONU to the headend, receiving the transmitted upstream optical signal at the headend; and performing a long loop gain control by the headend, comprising detect the level of the upstream optical signal received at the headend, and an adjusting by the headend, if the detected level of the received transmitted upstream optical signal exceeds a given level, the output level of the customer premises device RF transmitter, wherein the attenuating the amplified signal comprises controllably attenuating the amplified RF signal, based on a comparing of a level of the received optical downlink signal, and wherein the method further comprises setting the reference at a reference value wherein the comparing causes the controllably attenuating to output the attenuated amplified RF signal at a level at which the detected level of the upstream optical signal received at the headend does not exceed the given level, to prevent the headend, in performing the long loop gain control, from adjusting the output of level customer premises RF transmitter.

* * * * *